(12) United States Patent
Almeida et al.

(10) Patent No.: US 11,866,063 B2
(45) Date of Patent: Jan. 9, 2024

(54) COMMUNICATION SYSTEM AND METHOD

(71) Applicant: MAGNA ELECTRONICS INC., Auburn Hills, MI (US)

(72) Inventors: Ramiro Almeida, Key Biscayne, FL (US); Pierre Beaudreau, Cambridge, MA (US); Alexandra Klotz, Cambridge, MA (US); Dana Kirsanov, Boston, MA (US); Disha Sule, Quincy, MA (US); Louise Katzovitz, Boston, MA (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 304 days.

(21) Appl. No.: 17/146,071

(22) Filed: Jan. 11, 2021

(65) Prior Publication Data
US 2021/0213970 A1 Jul. 15, 2021

Related U.S. Application Data

(60) Provisional application No. 62/959,400, filed on Jan. 10, 2020.

(51) Int. Cl.
*B60W 60/00* (2020.01)
*G01C 21/34* (2006.01)
*G10L 15/22* (2006.01)

(52) U.S. Cl.
CPC ....... *B60W 60/001* (2020.02); *G01C 21/3438* (2013.01); *G10L 15/22* (2013.01);
(Continued)

(58) Field of Classification Search
CPC ........... B60W 60/001; B60W 2540/21; B60W 50/14; B60W 50/10; G01C 21/3438;
(Continued)

(56) References Cited

U.S. PATENT DOCUMENTS 3,997,868 A 12/1976 Ribnick et al.
4,930,742 A 6/1990 Schofield et al.
(Continued)

FOREIGN PATENT DOCUMENTS

DE 102013004271 A1 9/2013
JP 2018163668 A 10/2018
(Continued)

OTHER PUBLICATIONS

International Search Report and Written Opinion dated Apr. 14, 2021 for corresponding PCT Application No. PCT/US2021/012958.
(Continued)

*Primary Examiner* — Peter D Nolan
*Assistant Examiner* — Peter Y Ning
(74) *Attorney, Agent, or Firm* — HONIGMAN LLP

(57) ABSTRACT

A method, computer program product, and computing system for monitoring the interior of an autonomous vehicle for information being provided by a rider of the autonomous vehicle to the autonomous vehicle; and processing the information provided by the rider of the autonomous vehicle to the autonomous vehicle to generate a response based, at least in part, upon the information provided by the rider of the autonomous vehicle.

30 Claims, 5 Drawing Sheets

(52) U.S. Cl.
CPC .... *B60W 2540/21* (2020.02); *G10L 2015/221* (2013.01); *G10L 2015/223* (2013.01); *G10L 2015/228* (2013.01)

(58) Field of Classification Search
CPC ............... G10L 15/22; G10L 2015/221; G10L 2015/223; G10L 2015/228
See application file for complete search history.

(56) References Cited

U.S. PATENT DOCUMENTS

| | | | |
|---|---|---|---|
| 4,956,866 A | 9/1990 | Bernstein et al. |
| 4,959,865 A | 9/1990 | Stettiner et al. |
| 4,975,966 A | 12/1990 | Sapiejewski |
| 5,287,411 A | 2/1994 | Hill et al. |
| 5,329,593 A | 7/1994 | Lazzeroni et al. |
| 5,495,242 A | 2/1996 | Kick et al. |
| 5,550,677 A | 8/1996 | Schofield et al. |
| 5,670,935 A | 9/1997 | Schofield et al. |
| 5,671,996 A | 9/1997 | Bos et al. |
| 5,703,957 A | 12/1997 | McAteer |
| 5,820,245 A | 10/1998 | Desmond et al. |
| 5,828,012 A | 10/1998 | Repolle et al. |
| 5,850,016 A | 12/1998 | Jung et al. |
| 5,877,897 A | 3/1999 | Schofield et al. |
| 5,878,147 A | 3/1999 | Killion et al. |
| 5,894,279 A | 4/1999 | Rose et al. |
| 5,949,331 A | 9/1999 | Schofield et al. |
| 5,979,586 A | 11/1999 | Farmer et al. |
| 6,166,625 A | 12/2000 | Teowee et al. |
| 6,243,003 B1 | 6/2001 | DeLine et al. |
| 6,278,377 B1 | 8/2001 | DeLine et al. |
| 6,326,613 B1 | 12/2001 | Heslin et al. |
| 6,329,925 B1 | 12/2001 | Skiver et al. |
| 6,362,749 B1 | 3/2002 | Brill |
| 6,363,156 B1 | 3/2002 | Roddy |
| 6,366,213 B2 | 4/2002 | DeLine et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,485,081 B1 | 11/2002 | Bingle et al. |
| 6,501,387 B2 | 12/2002 | Skiver et al. |
| 6,570,992 B1 | 5/2003 | Folan et al. |
| 6,587,186 B2 | 7/2003 | Bamji et al. |
| 6,614,911 B1 | 9/2003 | Watson et al. |
| 6,648,477 B2 | 11/2003 | Hutzel et al. |
| 6,678,039 B2 | 1/2004 | Charbon |
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,717,524 B2 | 4/2004 | DeLine et al. |
| 6,774,356 B2 | 8/2004 | Heslin et al. |
| 6,798,890 B2 | 9/2004 | Killion et al. |
| 6,876,775 B2 | 4/2005 | Torunoglu |
| 6,882,734 B2 | 4/2005 | Watson et al. |
| 6,906,632 B2 | 6/2005 | DeLine et al. |
| 6,906,793 B2 | 6/2005 | Bamji et al. |
| 6,919,549 B2 | 7/2005 | Bamji et al. |
| 6,958,707 B1 | 10/2005 | Siegel |
| 6,980,092 B2 | 12/2005 | Turnbull et al. |
| 6,980,663 B1 | 12/2005 | Linhard |
| 7,038,577 B2 | 5/2006 | Pawlicki et al. |
| 7,053,357 B2 | 5/2006 | Schwarte |
| 7,061,402 B1 | 6/2006 | Lawson |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,245,232 B1 | 7/2007 | Caouette, Sr. |
| 7,283,213 B2 | 10/2007 | O'Connor et al. |
| 7,308,341 B2 | 12/2007 | Schofield et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,415,116 B1 | 8/2008 | Fels |
| 7,580,795 B2 | 8/2009 | McCarthy et al. |
| 7,657,052 B2 | 2/2010 | Larson et al. |
| 7,675,431 B1 | 3/2010 | Caouette, Sr. |
| 7,720,580 B2 | 5/2010 | Higgins-Luthman |
| 7,791,499 B2 | 9/2010 | Mohan et al. |
| 7,855,755 B2 | 12/2010 | Weller et al. |
| 8,013,780 B2 | 9/2011 | Lynam |
| 8,027,029 B2 | 9/2011 | Lu et al. |
| 8,094,040 B1 | 1/2012 | Cornett et al. |
| 8,258,932 B2 | 9/2012 | Wahlstrom |
| 8,275,145 B2 | 9/2012 | Buck et al. |
| 8,319,620 B2 | 11/2012 | Usher et al. |
| 8,355,521 B2 | 1/2013 | Arson et al. |
| 8,392,064 B2 | 3/2013 | Thrun et al. |
| 8,676,427 B1 | 3/2014 | Ferguson et al. |
| 8,824,697 B2 | 9/2014 | Christoph |
| 8,849,557 B1 | 9/2014 | Levandowski |
| 9,036,026 B2 | 5/2015 | Dellantoni et al. |
| 9,146,898 B2 | 9/2015 | Ihlenburg et al. |
| 9,224,294 B1 | 12/2015 | St. John |
| 9,275,136 B1 | 3/2016 | Sharifi et al. |
| 9,278,689 B1 | 3/2016 | Delp |
| 9,280,202 B2 | 3/2016 | Gieseke et al. |
| 9,397,630 B2 | 7/2016 | Wang et al. |
| 9,405,120 B2 | 8/2016 | Graf et al. |
| 9,412,273 B2 | 8/2016 | Ricci |
| 9,417,838 B2 | 8/2016 | Baalu et al. |
| 9,470,033 B1 | 10/2016 | Dudar |
| 9,575,160 B1 | 2/2017 | Davis et al. |
| 9,575,560 B2 | 2/2017 | Poupyrev et al. |
| 9,576,208 B2 | 2/2017 | Agnew et al. |
| 9,599,702 B1 | 3/2017 | Bordes et al. |
| 9,689,967 B1 | 6/2017 | Stark et al. |
| 9,701,258 B2 | 7/2017 | Tiryaki |
| 9,753,121 B1 | 9/2017 | Davis et al. |
| 9,800,983 B2 | 10/2017 | Wacquant et al. |
| 9,811,164 B2 | 11/2017 | Poupyrev |
| 9,817,109 B2 | 11/2017 | Saboo et al. |
| 9,818,246 B2 | 11/2017 | Elie et al. |
| 9,982,474 B2 | 5/2018 | Dezorzi et al. |
| 10,137,777 B2 | 11/2018 | Lu et al. |
| 10,246,009 B2 | 4/2019 | McMahon et al. |
| 10,266,182 B2* | 4/2019 | Krishnan ............... B60W 50/10 |
| 10,346,888 B2* | 7/2019 | Nix .................... G06Q 10/0639 |
| 10,372,130 B1* | 8/2019 | Kaushansky ......... B60W 50/14 |
| 10,443,292 B2 | 10/2019 | Baruco et al. |
| 10,459,080 B1 | 10/2019 | Schwesig et al. |
| 10,476,500 B2 | 11/2019 | Powell et al. |
| 10,589,716 B2 | 3/2020 | Sobecki et al. |
| 10,598,504 B2* | 3/2020 | Oh ..................... G01C 21/3608 |
| 10,609,148 B1 | 3/2020 | Tran |
| 10,766,412 B1* | 9/2020 | Austin .................. G08G 1/005 |
| 10,789,840 B2 | 9/2020 | Boykin |
| 10,914,110 B2 | 2/2021 | Mitchell |
| 11,167,771 B2 | 11/2021 | Caron et al. |
| 11,244,564 B2 | 2/2022 | Seifert |
| 2002/0032510 A1 | 3/2002 | Turnbull et al. |
| 2002/0080021 A1 | 6/2002 | Skiver et al. |
| 2002/0110255 A1 | 8/2002 | Killion et al. |
| 2002/0110256 A1 | 8/2002 | Watson et al. |
| 2004/0155795 A1 | 8/2004 | Quintana |
| 2004/0170286 A1 | 9/2004 | Durach et al. |
| 2004/0258252 A1 | 12/2004 | Inoue et al. |
| 2005/0074131 A1 | 4/2005 | McCall et al. |
| 2006/0023892 A1 | 2/2006 | Schultz |
| 2006/0055630 A1 | 3/2006 | Cheang et al. |
| 2007/0008175 A1 | 1/2007 | Johnson et al. |
| 2007/0146127 A1 | 6/2007 | Stilp et al. |
| 2007/0216539 A1 | 9/2007 | D'Antoni et al. |
| 2008/0068187 A1 | 3/2008 | Bonefas et al. |
| 2008/0150786 A1 | 6/2008 | Breed |
| 2009/0028425 A1 | 1/2009 | Cavallaro et al. |

(56) References Cited

U.S. PATENT DOCUMENTS

| | | |
|---|---|---|
| 2009/0097674 A1 | 4/2009 | Watson et al. |
| 2009/0125311 A1 | 5/2009 | Haulick et al. |
| 2009/0179774 A1 | 7/2009 | Mohan et al. |
| 2009/0322559 A1 | 12/2009 | Yen et al. |
| 2010/0100284 A1 | 4/2010 | Kudo et al. |
| 2010/0231436 A1 | 9/2010 | Focke et al. |
| 2010/0245066 A1 | 9/2010 | Sarioglu et al. |
| 2011/0199230 A1 | 8/2011 | Stahlin et al. |
| 2011/0296794 A1 | 12/2011 | Thomas et al. |
| 2012/0062743 A1 | 3/2012 | Lynam et al. |
| 2012/0072051 A1 | 3/2012 | Koon et al. |
| 2012/0121113 A1 | 5/2012 | Li |
| 2012/0136559 A1 | 5/2012 | Rothschild |
| 2012/0218412 A1 | 8/2012 | Dellantoni et al. |
| 2012/0230504 A1 | 9/2012 | Kuroda |
| 2013/0049985 A1 | 2/2013 | Eisenson et al. |
| 2013/0124038 A1 | 5/2013 | Naboulsi |
| 2013/0222592 A1 | 8/2013 | Gieseke |
| 2013/0223643 A1 | 8/2013 | Sato et al. |
| 2013/0261871 A1 | 10/2013 | Hobbs et al. |
| 2014/0078291 A1 | 3/2014 | Hammarstrom et al. |
| 2014/0218529 A1 | 8/2014 | Mahmoud et al. |
| 2014/0266853 A1 | 9/2014 | Orr et al. |
| 2014/0309878 A1 | 10/2014 | Ricci |
| 2014/0336876 A1 | 11/2014 | Gieseke et al. |
| 2014/0350927 A1 | 11/2014 | Yamabe et al. |
| 2014/0375476 A1 | 12/2014 | Johnson et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0025709 A1 | 1/2015 | Spaulding et al. |
| 2015/0061895 A1 | 3/2015 | Ricci |
| 2015/0065060 A1 | 3/2015 | Stahlin |
| 2015/0066284 A1 | 3/2015 | Yopp |
| 2015/0092042 A1 | 4/2015 | Fursich |
| 2015/0137998 A1 | 5/2015 | Marti et al. |
| 2015/0142244 A1 | 5/2015 | You et al. |
| 2015/0161458 A1 | 6/2015 | Agnew et al. |
| 2015/0181175 A1 | 6/2015 | Camilleri et al. |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0332425 A1* | 11/2015 | Kalanick ............... G06Q 10/02 705/13 |
| 2015/0348580 A1 | 12/2015 | van Hoff |
| 2015/0352953 A1 | 12/2015 | Koravadi |
| 2015/0382102 A1 | 12/2015 | Akino |
| 2016/0029111 A1 | 1/2016 | Wacquant et al. |
| 2016/0094911 A1 | 3/2016 | Kropf |
| 2016/0137126 A1 | 5/2016 | Fursich et al. |
| 2016/0191815 A1 | 6/2016 | Annau |
| 2016/0209647 A1 | 7/2016 | Fursich |
| 2016/0252905 A1 | 9/2016 | Tian et al. |
| 2016/0259037 A1 | 9/2016 | Molchanov et al. |
| 2016/0355124 A1 | 12/2016 | Cervantes Guarneros et al. |
| 2016/0355125 A1 | 12/2016 | Herbert |
| 2017/0109947 A1* | 4/2017 | Prokhorov ............... G10L 15/22 |
| 2017/0217445 A1* | 8/2017 | Tzirkel-Hancock ...... B60T 7/12 |
| 2017/0222311 A1 | 8/2017 | Hess et al. |
| 2017/0254873 A1 | 9/2017 | Koravadi |
| 2017/0267169 A1 | 9/2017 | Fleurence et al. |
| 2017/0274906 A1 | 9/2017 | Hassan et al. |
| 2017/0276788 A1 | 9/2017 | Wodrich |
| 2017/0315231 A1 | 11/2017 | Wodrich |
| 2017/0323540 A1 | 11/2017 | Boykin |
| 2017/0356994 A1 | 12/2017 | Wodrich et al. |
| 2018/0015875 A1 | 1/2018 | May et al. |
| 2018/0045812 A1 | 2/2018 | Hess |
| 2018/0046255 A1 | 2/2018 | Rothera et al. |
| 2018/0050698 A1 | 2/2018 | Polisson |
| 2018/0077506 A1 | 3/2018 | Wacquant et al. |
| 2018/0079427 A1* | 3/2018 | Herz ..................... G06F 3/0482 |
| 2018/0137756 A1 | 5/2018 | Moosaei |
| 2018/0170309 A1 | 6/2018 | McMahon et al. |
| 2018/0194366 A1 | 7/2018 | Krishnan et al. |
| 2018/0196501 A1 | 7/2018 | Trotta |
| 2018/0202822 A1* | 7/2018 | DeLizio ................. B60R 25/24 |
| 2018/0222414 A1 | 8/2018 | Ihlenburg et al. |
| 2018/0231635 A1 | 8/2018 | Woehlte |
| 2018/0238099 A1 | 8/2018 | Schatz et al. |
| 2018/0251122 A1* | 9/2018 | Golston ............... B60W 30/025 |
| 2018/0261237 A1 | 9/2018 | Moore et al. |
| 2018/0284772 A1* | 10/2018 | Ravichandran ....... B60W 10/04 |
| 2018/0350391 A1 | 12/2018 | Moore et al. |
| 2018/0364704 A1* | 12/2018 | Liu ..................... G07C 5/0816 |
| 2019/0018364 A1 | 1/2019 | Kim |
| 2019/0051302 A1* | 2/2019 | Gonzalez .............. G06V 20/59 |
| 2019/0122056 A1 | 4/2019 | Tran et al. |
| 2019/0153770 A1 | 5/2019 | Mitchell et al. |
| 2019/0162010 A1 | 5/2019 | Rafrafi et al. |
| 2019/0162821 A1 | 5/2019 | Rafrafi et al. |
| 2019/0162822 A1 | 5/2019 | Rafrafi et al. |
| 2019/0220010 A1* | 7/2019 | Leonard ............... B60W 50/14 |
| 2019/0227553 A1* | 7/2019 | Kentley-Klay ........ B60L 58/12 |
| 2019/0309564 A1 | 10/2019 | Mitchell et al. |
| 2019/0337532 A1 | 11/2019 | Myers et al. |
| 2019/0339382 A1 | 11/2019 | Hess et al. |
| 2019/0371297 A1 | 12/2019 | Kim et al. |
| 2020/0018111 A1 | 1/2020 | Akbarian et al. |
| 2020/0143560 A1 | 5/2020 | Lu et al. |
| 2020/0157873 A1 | 5/2020 | Sabatini et al. |
| 2020/0191589 A1* | 6/2020 | Tamai ................. G01C 21/3697 |
| 2020/0202151 A1 | 6/2020 | Wacquant |
| 2020/0216086 A1* | 7/2020 | Lenke ..................... G06F 3/167 |
| 2020/0320320 A1 | 10/2020 | Lynam |
| 2020/0353862 A1* | 11/2020 | Schaye ................. B60Q 1/2603 |
| 2021/0174590 A1* | 6/2021 | Huet ...................... G06F 3/011 |
| 2021/0262274 A1 | 8/2021 | Schatz et al. |
| 2021/0291739 A1 | 9/2021 | Kasarla et al. |
| 2021/0323473 A1 | 10/2021 | Peterson et al. |

FOREIGN PATENT DOCUMENTS

| | | |
|---|---|---|
| KR | 101588184 B1 | 1/2016 |
| KR | 101654694 B1 | 9/2016 |
| WO | 1998017046 | 4/1998 |
| WO | 199031637 | 6/1999 |
| WO | 2001037519 A2 | 5/2001 |
| WO | 2003091066 A2 | 11/2003 |
| WO | 2014172334 A1 | 10/2014 |
| WO | 2014204794 A1 | 12/2014 |

OTHER PUBLICATIONS

Real F.D., Berry F. (2009) Smart Cameras: Technologies and Applications. In: Belbachir A. (eds) Smart Cameras. Springer, Boston, MA. 2009 (Year: 2009).

Bendler et al., "Emergency Vehicle Detector," ECE4007 Senior Design Project, Sep. 15, 2008.

Fazenda et al., "Acoustic based safety emergency vehicle detection for intelligent transport systems," IEEE ICCAS-SICE Sep. 2009.

Fragoulis et al., "A Siren Detection System Based on Mechanical Resonant Filter5b4s," Sensors 2001, vol. 1, pp. 121-137, ISSN 1424-8220, MDPI, 2001.

Park et al., "Automatic Detection of Emergency Vehicles for Hearing Impaired Drivers," Texas A&M University—Kingsville, EE/CS Department, 2000.

Schroder et al., "Automatic Acoustic Siren Detection in Traffic Noise By Part-Based Models," University of Oldenburg, Germany, May 2013.

Schwander et al., "Effect of two-microphone noise reduction on speech recognition by normal-hearing listeners" Veterans Administration, Journal of Rehabilitation Research and Development, vol. 24, No. 4, pp. 87-92, Fall 1987.

Simmer et al., "Adaptive Microphone Arrays for Noise Suppression in the Frequency Domain" Second Cost 229 Workshop on Adaptive Algorithms in Communications, Bordeaux, 30.92.10.1992.

Zhang et al., "High-speed Noise Cancellation with Microphone Array" Technology Reports, NTT DoCoMo Technical Journal vol. 9, No. 4.

(56) References Cited

OTHER PUBLICATIONS

International Search Report and Written Opinion dated Aug. 3, 2020 from corresponding PCT Application No. PCT/CA2020/050673 and filed May 19, 2020.

* cited by examiner

COMMUNICATION SYSTEM AND METHOD

RELATED APPLICATION(S)

This application claims the benefit of U.S. Provisional Application No. 62/959,400, filed on 10 Jan. 2020, the entire contents of which are incorporated herein by reference.

TECHNICAL FIELD

This disclosure relates to communication systems and, more particularly, to communication systems for use in autonomous vehicles.

BACKGROUND

As transportation moves towards autonomous (i.e., driverless) vehicles, the manufactures and designers of these autonomous vehicles must address issues that are not a concern in traditional vehicles.

For example and with respect to hired vehicles, such hired vehicles are driven by a driver to which riders in the vehicle may speak. Accordingly, the rider in the vehicle may ask the driver questions, change their destination, ask the driver to make an unexpected stop midpoint in a trip, etc. However and with respect to autonomous vehicles, such discussions are difficult to have, being there is no human being with whom the rider make speak.

SUMMARY OF DISCLOSURE

In one implementation, a computer-implemented method is executed on a computing device and includes: monitoring the interior of an autonomous vehicle for information being provided by a rider of the autonomous vehicle to the autonomous vehicle; and processing the information provided by the rider of the autonomous vehicle to the autonomous vehicle to generate a response based, at least in part, upon the information provided by the rider of the autonomous vehicle.

One or more of the following features may be included. Monitoring the interior of an autonomous vehicle for information being provided by a rider of the autonomous vehicle to the autonomous vehicle may include: monitoring the interior of the autonomous vehicle for verbal information being provided by the rider of the autonomous vehicle to the autonomous vehicle; wherein the interior of the autonomous vehicle includes a microphone assembly for obtaining the verbal information provided by the rider of the autonomous vehicle. Monitoring the interior of an autonomous vehicle for information being provided by a rider of the autonomous vehicle to the autonomous vehicle may include: monitoring the interior of the autonomous vehicle for non-verbal information being provided by the rider of the autonomous vehicle to the autonomous vehicle; wherein the interior of the autonomous vehicle includes an input device for obtaining the non-verbal information provided by the rider of the autonomous vehicle. The non-verbal information may include one or more of: text-based information; and encoded information. The response may be provided to the rider of the autonomous vehicle. Providing the response to the rider of the autonomous vehicle may include: providing a verbal response to the rider of the autonomous vehicle; wherein the interior of the autonomous vehicle includes a speaker assembly for providing the verbal response to the rider of the autonomous vehicle. Providing the response to the rider of the autonomous vehicle may include: providing a non-verbal response to the rider of the autonomous vehicle; wherein the interior of the autonomous vehicle includes an output assembly for providing the non-verbal response to the rider of the autonomous vehicle. The non-verbal information may include one or more of: a text-based response; and a light-based response. The information provided by the rider of the autonomous vehicle may be verbal information. Processing the information provided by the rider of the autonomous vehicle to the autonomous vehicle to generate a response based, at least in part, upon the information provided by the rider of the autonomous vehicle may include: processing the verbal information provided by the rider of the autonomous vehicle to the autonomous vehicle using Natural Language Understanding (NLU) to generate a response based, at least in part, upon the verbal information provided by the rider of the autonomous vehicle.

In another implementation, a computer program product resides on a computer readable medium and has a plurality of instructions stored on it. When executed by a processor, the instructions cause the processor to perform operations including: monitoring the interior of an autonomous vehicle for information being provided by a rider of the autonomous vehicle to the autonomous vehicle; and processing the information provided by the rider of the autonomous vehicle to the autonomous vehicle to generate a response based, at least in part, upon the information provided by the rider of the autonomous vehicle.

One or more of the following features may be included. Monitoring the interior of an autonomous vehicle for information being provided by a rider of the autonomous vehicle to the autonomous vehicle may include: monitoring the interior of the autonomous vehicle for verbal information being provided by the rider of the autonomous vehicle to the autonomous vehicle; wherein the interior of the autonomous vehicle includes a microphone assembly for obtaining the verbal information provided by the rider of the autonomous vehicle. Monitoring the interior of an autonomous vehicle for information being provided by a rider of the autonomous vehicle to the autonomous vehicle may include: monitoring the interior of the autonomous vehicle for non-verbal information being provided by the rider of the autonomous vehicle to the autonomous vehicle; wherein the interior of the autonomous vehicle includes an input device for obtaining the non-verbal information provided by the rider of the autonomous vehicle. The non-verbal information may include one or more of: text-based information; and encoded information. The response may be provided to the rider of the autonomous vehicle. Providing the response to the rider of the autonomous vehicle may include: providing a verbal response to the rider of the autonomous vehicle; wherein the interior of the autonomous vehicle includes a speaker assembly for providing the verbal response to the rider of the autonomous vehicle. Providing the response to the rider of the autonomous vehicle may include: providing a non-verbal response to the rider of the autonomous vehicle; wherein the interior of the autonomous vehicle includes an output assembly for providing the non-verbal response to the rider of the autonomous vehicle. The non-verbal information may include one or more of: a text-based response; and a light-based response. The information provided by the rider of the autonomous vehicle may be verbal information. Processing the information provided by the rider of the autonomous vehicle to the autonomous vehicle to generate a response based, at least in part, upon the information provided by the rider of the autonomous vehicle may include: processing the verbal information provided by the rider of the autonomous vehicle to the autonomous vehicle using Natural Language Understanding (NLU) to generate a response based, at least in part, upon the verbal information provided by the rider of the autonomous vehicle.

In another implementation, a computing system includes a processor and memory is configured to perform operations including: monitoring the interior of an autonomous vehicle for information being provided by a rider of the autonomous vehicle to the autonomous vehicle; and processing the information provided by the rider of the autonomous vehicle to the autonomous vehicle to generate a response based, at least in part, upon the information provided by the rider of the autonomous vehicle.

One or more of the following features may be included. Monitoring the interior of an autonomous vehicle for information being provided by a rider of the autonomous vehicle to the autonomous vehicle may include: monitoring the interior of the autonomous vehicle for verbal information being provided by the rider of the autonomous vehicle to the autonomous vehicle; wherein the interior of the autonomous vehicle includes a microphone assembly for obtaining the verbal information provided by the rider of the autonomous vehicle. Monitoring the interior of an autonomous vehicle for information being provided by a rider of the autonomous vehicle to the autonomous vehicle may include: monitoring the interior of the autonomous vehicle for non-verbal information being provided by the rider of the autonomous vehicle to the autonomous vehicle; wherein the interior of the autonomous vehicle includes an input device for obtaining the non-verbal information provided by the rider of the autonomous vehicle. The non-verbal information may include one or more of: text-based information; and encoded information. The response may be provided to the rider of the autonomous vehicle. Providing the response to the rider of the autonomous vehicle may include: providing a verbal response to the rider of the autonomous vehicle; wherein the interior of the autonomous vehicle includes a speaker assembly for providing the verbal response to the rider of the autonomous vehicle. Providing the response to the rider of the autonomous vehicle may include: providing a non-verbal response to the rider of the autonomous vehicle; wherein the interior of the autonomous vehicle includes an output assembly for providing the non-verbal response to the rider of the autonomous vehicle. The non-verbal information may include one or more of: a text-based response; and a light-based response. The information provided by the rider of the autonomous vehicle may be verbal information. Processing the information provided by the rider of the autonomous vehicle to the autonomous vehicle to generate a response based, at least in part, upon the information provided by the rider of the autonomous vehicle may include: processing the verbal information provided by the rider of the autonomous vehicle to the autonomous vehicle using Natural Language Understanding (NLU) to generate a response based, at least in part, upon the verbal information provided by the rider of the autonomous vehicle.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Autonomous Vehicle Overview

Figure 1:
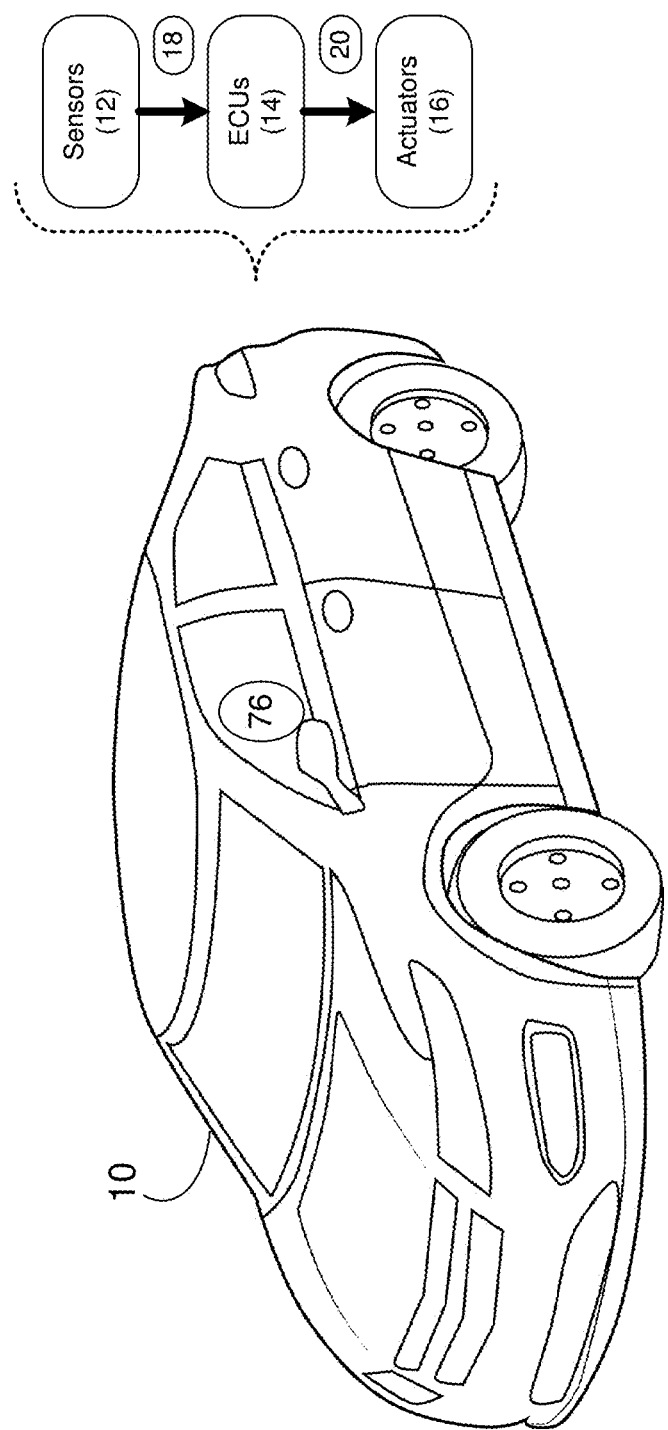
FIG. 1 is a diagrammatic view of an autonomous vehicle according to an embodiment of the present disclosure.

Referring to FIG. 1, there is shown autonomous vehicle 10. As is known in the art, an autonomous vehicle (e.g. autonomous vehicle 10) is a vehicle that is capable of sensing its environment and moving with little or no human input. Autonomous vehicles (e.g. autonomous vehicle 10) may combine a variety of sensor systems to perceive their surroundings, examples of which may include but are not limited to radar, computer vision, LIDAR, GPS, odometry, temperature and inertia, wherein such sensor systems may be configured to interpret lanes and markings on a roadway, street signs, stoplights, pedestrians, other vehicles, roadside objects, hazards, etc.

Autonomous vehicle 10 may include a plurality of sensors (e.g. sensors 12), a plurality of electronic control units (e.g. ECUs 14) and a plurality of actuators (e.g. actuators 16). Accordingly, sensors 12 within autonomous vehicle 10 may monitor the environment in which autonomous vehicle 10 is operating, wherein sensors 12 may provide sensor data 18 to ECUs 14. ECUs 14 may process sensor data 18 to determine the manner in which autonomous vehicle 10 should move. ECUs 14 may then provide control data 20 to actuators 16 so that autonomous vehicle 10 may move in the manner decided by ECUs 14. For example, a machine vision sensor included within sensors 12 may "read" a speed limit sign stating that the speed limit on the road on which autonomous vehicle 10 is traveling is now 35 miles an hour. This machine vision sensor included within sensors 12 may provide sensor data 18 to ECUs 14 indicating that the speed on the road on which autonomous vehicle 10 is traveling is now 35 mph. Upon receiving sensor data 18, ECUs 14 may process sensor data 18 and may determine that autonomous vehicle 10 (which is currently traveling at 45 mph) is traveling too fast and needs to slow down. Accordingly, ECUs 14 may provide control data 20 to actuators 16, wherein control data 20 may e.g. apply the brakes of autonomous vehicle 10 or eliminate any actuation signal currently being applied to the accelerator (thus allowing autonomous vehicle 10 to coast until the speed of autonomous vehicle 10 is reduced to 35 mph).

System Redundancy

As would be imagined, since autonomous vehicle 10 is being controlled by the various electronic systems included therein (e.g. sensors 12, ECUs 14 and actuators 16), the potential failure of one or more of these systems should be considered when designing autonomous vehicle 10 and appropriate contingency plans may be employed.

Figure 2A:
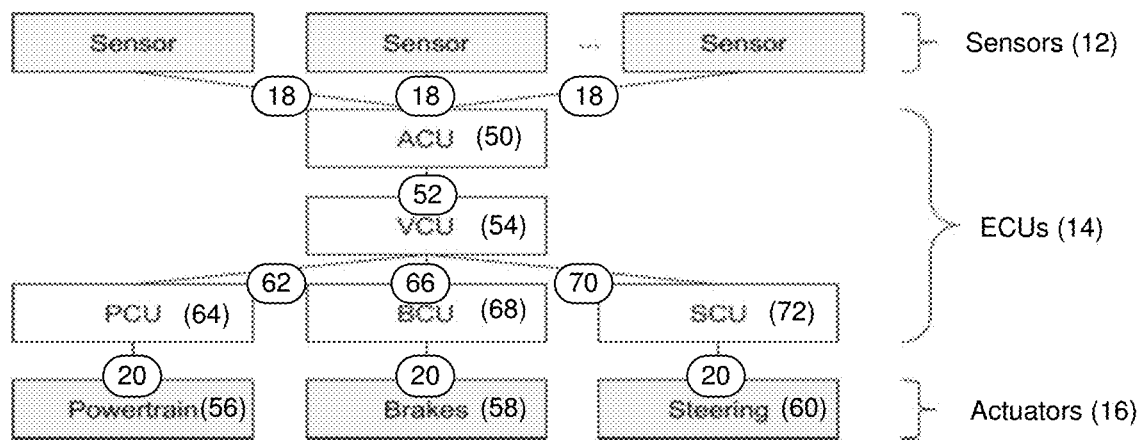
FIG. 2A is a diagrammatic view of one embodiment of the various systems included within the autonomous vehicle of FIG. 1 according to an embodiment of the present disclosure.

For example and referring also to FIG. 2A, the various ECUs (e.g., ECUs 14) that are included within autonomous vehicle 10 may be compartmentalized so that the responsibilities of the various ECUs (e.g., ECUs 14) may be logically grouped. For example, ECUs 14 may include autonomy control unit 50 that may receive sensor data 18 from sensors 12.

Autonomy control unit 50 may be configured to perform various functions. For example, autonomy control unit 50 may receive and process exteroceptive sensor data (e.g., sensor data 18), may estimate the position of autonomous vehicle 10 within its operating environment, may calculate a representation of the surroundings of autonomous vehicle 10, may compute safe trajectories for autonomous vehicle 10, and may command the other ECUs (in particular, a vehicle control unit) to cause autonomous vehicle 10 to execute a desired maneuver. Autonomy control unit 50 may include substantial compute power, persistent storage, and memory.

Accordingly, autonomy control unit 50 may process sensor data 18 to determine the manner in which autonomous vehicle 10 should be operating. Autonomy control unit 50 may then provide vehicle control data 52 to vehicle control unit 54, wherein vehicle control unit 54 may then process vehicle control data 52 to determine the manner in which the individual control systems (e.g. powertrain system 56, braking system 58 and steering system 60) should respond in order to achieve the trajectory defined by autonomy control unit 50 within vehicle control data 52.

Vehicle control unit 54 may be configured to control other ECUs included within autonomous vehicle 10. For example, vehicle control unit 54 may control the steering, powertrain, and brake controller units. For example, vehicle control unit 54 may provide: powertrain control signal 62 to powertrain control unit 64; braking control signal 66 to braking control unit 68; and steering control signal 70 to steering control unit 72.

Powertrain control unit 64 may process powertrain control signal 62 so that the appropriate control data (commonly represented by control data 20) may be provided to powertrain system 56. Additionally, braking control unit 68 may process braking control signal 66 so that the appropriate control data (commonly represented by control data 20) may be provided to braking system 58. Further, steering control unit 72 may process steering control signal 70 so that the appropriate control data (commonly represented by control data 20) may be provided to steering system 60.

Powertrain control unit 64 may be configured to control the transmission (not shown) and engine/traction motor (not shown) within autonomous vehicle 10; while brake control unit 68 may be configured to control the mechanical/regenerative braking system (not shown) within autonomous vehicle 10; and steering control unit 72 may be configured to control the steering column/steering rack (not shown) within autonomous vehicle 10.

Autonomy control unit 50 may be a highly complex computing system that may provide extensive processing capabilities (e.g., a workstation-class computing system with multi-core processors, discrete co-processing units, gigabytes of memory, and persistent storage). In contrast, vehicle control unit 54 may be a much simpler device that may provide processing power equivalent to the other ECUs included within autonomous vehicle 10 (e.g., a computing system having a modest microprocessor (with a CPU frequency of less than 200 megahertz), less than 1 megabyte of system memory, and no persistent storage). Due to these simpler designs, vehicle control unit 54 may have greater reliability and durability than autonomy control unit 50.

To further enhance redundancy and reliability, one or more of the ECUs (ECUs 14) included within autonomous vehicle 10 may be configured in a redundant fashion. For example and referring also to FIG. 2B, there is shown one implementation of ECUs 14 wherein a plurality of vehicle control units are utilized. For example, this particular implementation is shown to include two vehicle control units, namely a first vehicle control unit (e.g., vehicle control unit 54) and a second vehicle control unit (e.g., vehicle control unit 74).

In this particular configuration, the two vehicle control units (e.g. vehicle control units 54, 74) may be configured in various ways. For example, the two vehicle control units (e.g. vehicle control units 54, 74) may be configured in an active—passive configuration, wherein e.g. vehicle control unit 54 performs the active role of processing vehicle control data 52 while vehicle control unit 74 assumes a passive role and is essentially in standby mode. In the event of a failure of vehicle control unit 54, vehicle control unit 74 may transition from a passive role to an active role and assume the role of processing vehicle control data 52. Alternatively, the two vehicle control units (e.g. vehicle control units 54, 74) may be configured in an active—active configuration, wherein e.g. both vehicle control unit 52 and vehicle control unit 74 perform the active role of processing vehicle control data 54 (e.g. divvying up the workload), wherein in the event of a failure of either vehicle control unit 54 or vehicle control unit 74, the surviving vehicle control unit may process all of vehicle control data 52.

Figure 2B:
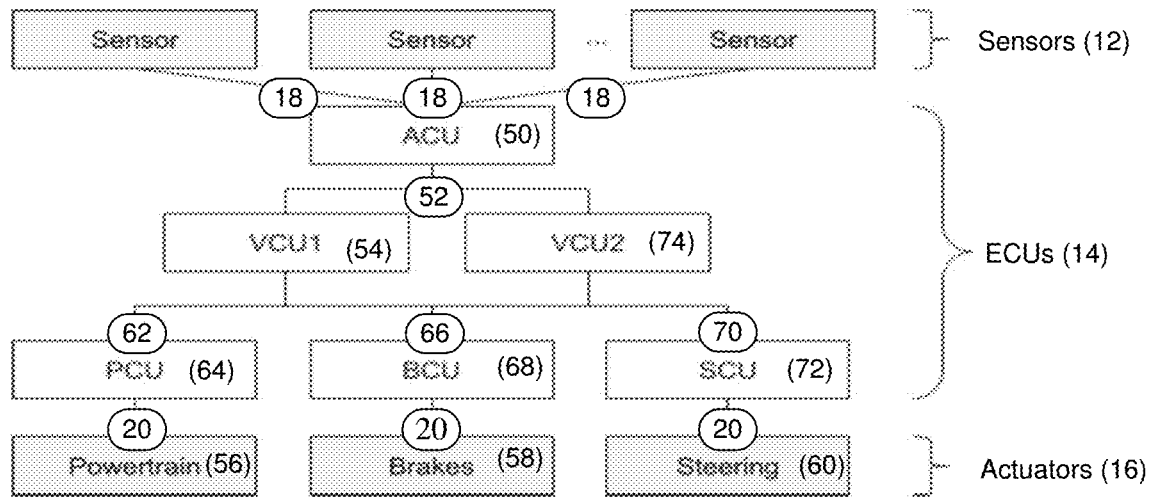
FIG. 2B is a diagrammatic view of another embodiment of the various systems included within the autonomous vehicle of FIG. 1 according to an embodiment of the present disclosure.

While FIG. 2B illustrates one example of the manner in which the various ECUs (e.g. ECUs 14) included within autonomous vehicle 10 may be configured in a redundant fashion, this is for illustrative purposes only and is not intended to be a limitation of this disclosure, as other configurations are possible and are considered to be within the scope of this disclosure. For example, autonomous control unit 50 may be configured in a redundant fashion, wherein a second autonomous control unit (not shown) is included within autonomous vehicle 10 and is configured in an active—passive or active—active fashion. Further, it is foreseeable that one or more of the sensors (e.g., sensors 12) and/or one or more of the actuators (e.g. actuators 16) may be configured in a redundant fashion. Accordingly, it is understood that the level of redundancy achievable with respect to autonomous vehicle 10 may only be limited by the design criteria and budget constraints of autonomous vehicle 10.

Autonomy Computational Subsystems

Figure 3:
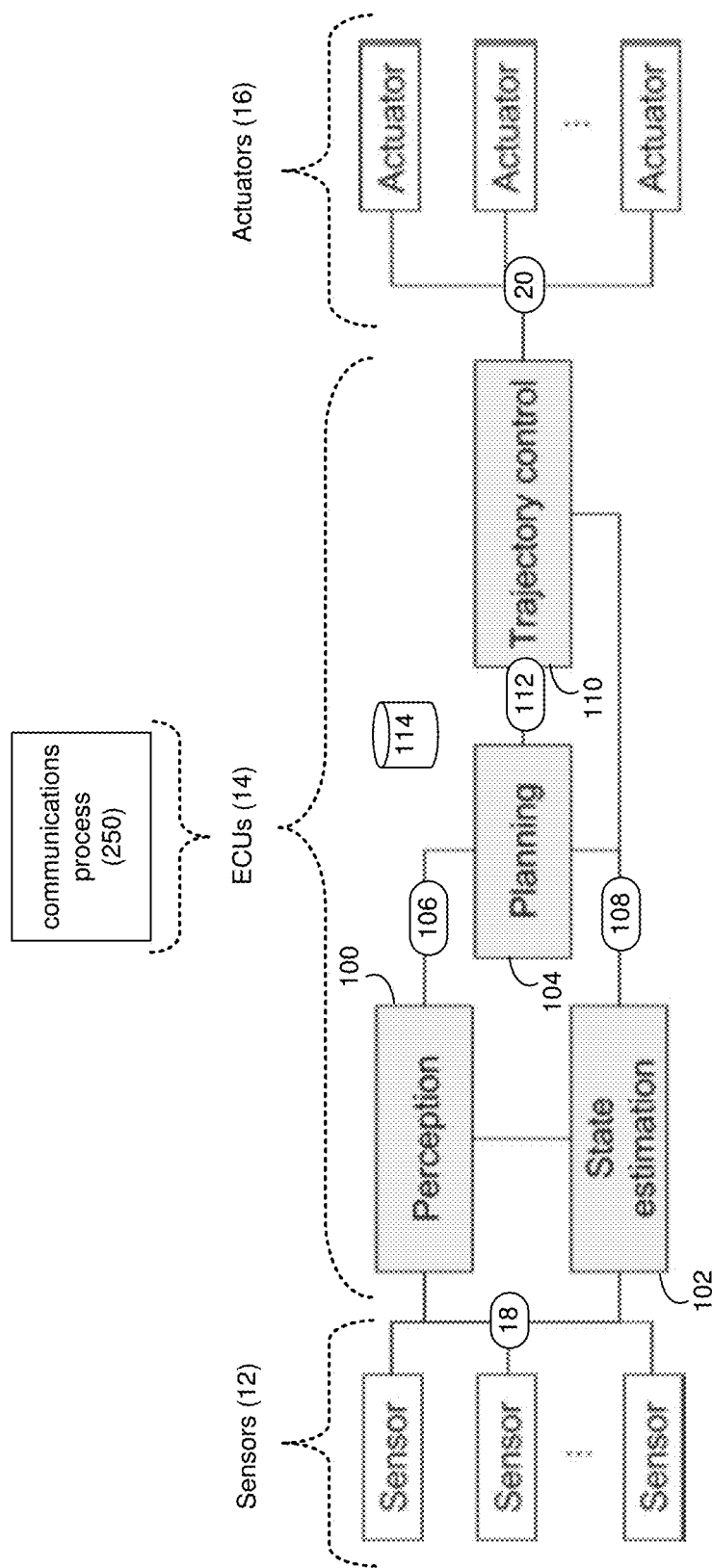
FIG. 3 is a diagrammatic view of another embodiment of the various systems included within the autonomous vehicle of FIG. 1 according to an embodiment of the present disclosure.

Referring also to FIG. 3, the various ECUs of autonomous vehicle 10 may be grouped/arranged/configured to effectuate various functionalities.

For example, one or more of ECUs 14 may be configured to effectuate/form perception subsystem 100, wherein perception subsystem 100 may be configured to process data from onboard sensors (e.g., sensor data 18) to calculate concise representations of objects of interest near autonomous vehicle 10 (examples of which may include but are not limited to other vehicles, pedestrians, traffic signals, traffic signs, road markers, hazards, etc.) and to identify environmental features that may assist in determining the location of autonomous vehicle 10. Further, one or more of ECUs 14 may be configured to effectuate/form state estimation subsystem 102, wherein state estimation subsystem 102 may be configured to process data from onboard sensors (e.g., sensor data 18) to estimate the position, orientation, and velocity of autonomous vehicle 10 within its operating environment. Additionally, one or more of ECUs 14 may be configured to effectuate/form planning subsystem 104, wherein planning subsystem 104 may be configured to calculate a desired vehicle trajectory (using perception output 106 and state estimation output 108). Further still, one or more of ECUs 14 may be configured to effectuate/form trajectory control subsystem 110, wherein trajectory control subsystem 110 uses planning output 112 and state estimation output 108 (in conjunction with feedback and/or feedforward control techniques) to calculate actuator commands (e.g., control data 20) that may cause autonomous vehicle 10 to execute its intended trajectory within it operating environment.

For redundancy purposes, the above-described subsystems may be distributed across various devices (e.g., autonomy control unit 50 and vehicle control units 54, 74). Additionally/alternatively and due to the increased computational requirements, perception subsystem 100 and planning subsystem 104 may be located almost entirely within autonomy control unit 50, which (as discussed above) has much more computational horsepower than vehicle control units 54, 74. Conversely and due to their lower computational requirements, state estimation subsystem 102 and trajectory control subsystem 110 may be: located entirely on vehicle control units 54, 74 if vehicle control units 54, 74 have the requisite computational capacity; and/or located partially on vehicle control units 54, 74 and partially on autonomy control unit 50. However, the location of state estimation subsystem 102 and trajectory control subsystem 110 may be of critical importance in the design of any contingency planning architecture, as the location of these subsystems may determine how contingency plans are calculated, transmitted, and/or executed.

Figure 4:
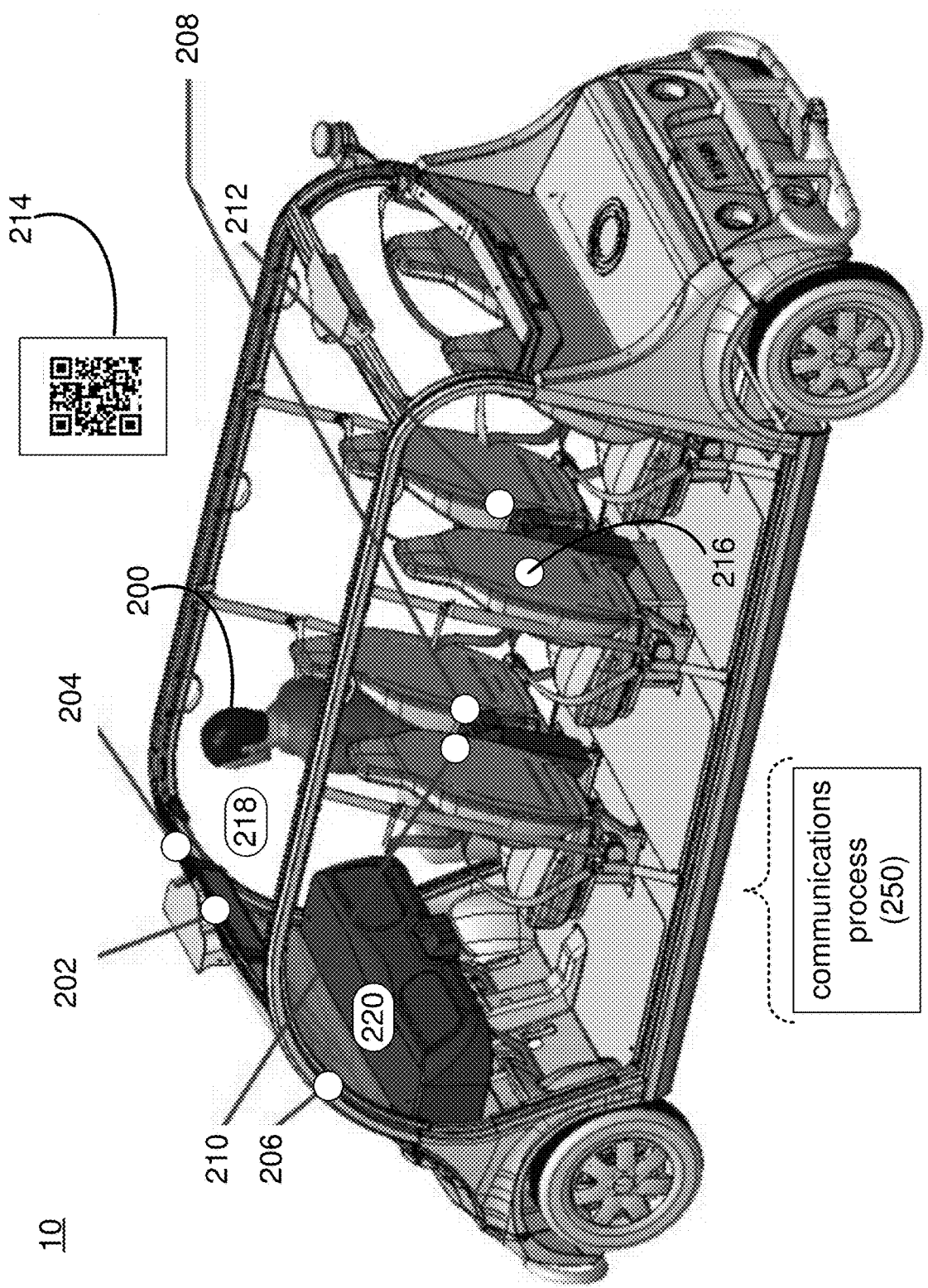
FIG. 4 is an interior view of autonomous vehicle of FIG. 1 according to an embodiment of the present disclosure.

Referring also to FIG. 4, there is shown an interior view of autonomous vehicle 10, wherein autonomous vehicle 10 may include various systems/devices that enable a rider (e.g., rider 200) to communicate with autonomous vehicle 10. For example, autonomous vehicle 10 nay include contextual display assembly 202, light display assembly 204, speaker assembly 206, microphone assembly 208, scanner assembly 210 and keyboard assembly 212.

Specifically and as will be discussed below:

Contextual Display Assembly 202 may be configured to enable autonomous vehicle 10 to provide text-based information to a rider (e.g., rider 200) of autonomous vehicle 10. For example, if autonomous vehicle 10 is approaching its intended destination, contextual display assembly 202 may be configured to render a text-based message for rider 200 that says "Arriving at your destination. Please exit from the right-side of the vehicle."

Light Display Assembly 204 may be configured to enable autonomous vehicle 10 to provide image-based information to a rider (e.g., rider 200) of autonomous vehicle 10. For example, if autonomous vehicle 10 is going to be turning right at an intersection, light display assembly 204 may be configured to render a right-sweeping image to indicate that autonomous vehicle 10 will be turning right.

Speaker Assembly 206 may be configured to enable autonomous vehicle 10 to provide audio-based information to a rider (e.g., rider 200) of autonomous vehicle 10. For example, if autonomous vehicle 10 just picked up a rider and is getting ready to depart, speaker assembly 206 may be configured to render an audio-based message that says "Welcome aboard. Please buckle your seatbelt so we can depart."

Microphone Assembly 208 may be configured to enable a rider (e.g., rider 200) of autonomous vehicle 10 to provide audio-based information to autonomous vehicle 10. For example, if a rider (e.g., rider 200) of autonomous vehicle 10 is displeased with the condition of autonomous vehicle 10, microphone assembly 208 may be configured to enable rider 200 to provide verbal feedback to autonomous vehicle 10 (or to a person remotely-monitoring the operation of autonomous vehicle 10).

Scanner Assembly 210 may be configured to enable a rider (e.g., rider 200) of autonomous vehicle 10 to provide encoded information to autonomous vehicle 10. For example, if a rider (e.g., rider 200) entered autonomous vehicle 10 after hailing autonomous vehicle 10 using a remote application, scanner assembly 210 may be configured to scan a QR code rendered on a handheld device (e.g., a smartphone) of rider 200 to authenticate rider 200. Additionally/alternatively, scanner assembly 210 may be configured to enable rider 200 to pay for their trip within autonomous vehicle 10 by e.g., scanning a credit card or paying via ApplePay™, GooglePay™ or SamsungPay™.

Keyboard Assembly 212 may be configured to enable a rider (e.g., rider 200) of autonomous vehicle 10 to provide text-based information to autonomous vehicle 10. For example, if a rider (e.g., rider 200) entered autonomous vehicle 10 without a destination being predefined, keyboard assembly 212 may be configured to enable rider 200 to type in an intended destination.

Figure 5:
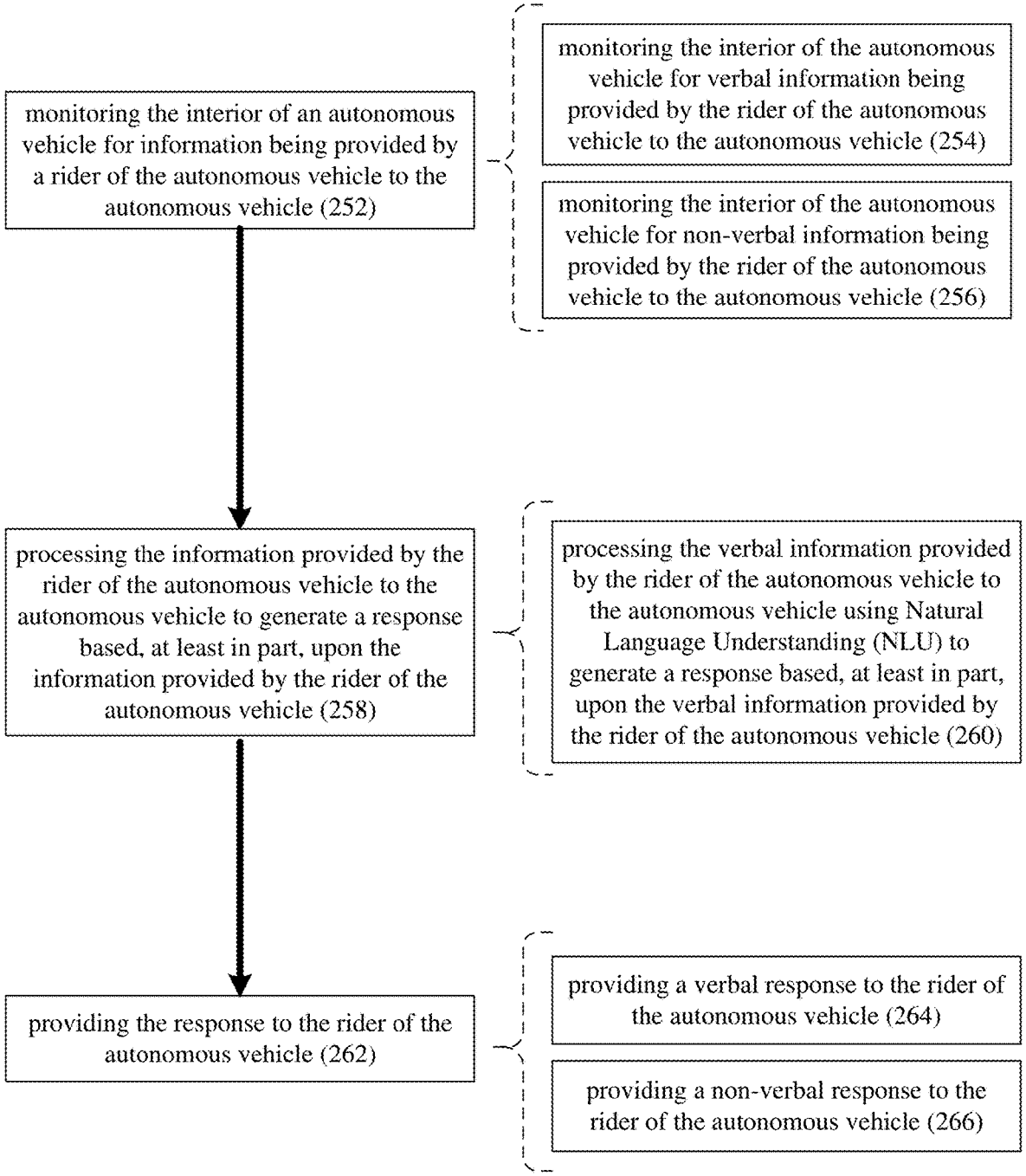
FIG. 5 is a flowchart of a communication process executed on one or more systems of the autonomous vehicle of FIG. 1 according to an embodiment of the present disclosure.

Referring also to FIG. 5 and in order to enable such communication between the rider (e.g., rider 200) and autonomous vehicle 10, one or more of ECUs 14 (see FIG. 3) may execute communication process 250. Communication process 250 may be executed on a single ECU or may be executed collaboratively across multiple ECUs. For example, communication process 250 may be executed solely by autonomy control unit 50, vehicle control unit 54 or vehicle control unit 74. Alternatively, communication process 250 may be executed collaboratively across the combination of autonomy control unit 50, vehicle control unit 54 and vehicle control unit 74. Accordingly and in the latter configuration, in the event of a failure of one of autonomy control unit 50, vehicle control unit 54 or vehicle control unit 74, the surviving control unit(s) may continue to execute communication process 250.

The instruction sets and subroutines of communication process 250, which may be stored on storage device 114 (see FIG. 3) coupled to ECUs 14, may be executed by one or more processors (not shown) and one or more memory architectures (not shown) included within ECUs 14. Examples of storage device 114 may include but are not limited to: a hard disk drive; a RAID device; a random-access memory (RAM); a read-only memory (ROM); and all forms of flash memory storage devices.

With respect to the above-described systems/devices that enable a rider (e.g., rider 200) to communicate with autonomous vehicle 10, these various systems/devices may be configured to provide different types of functionality, as discussed below.

Ride Request

A rider (e.g., rider 200) may sign in to a mobile or web application (not shown) wherein the rider (e.g., rider 200) may have a stored user profile that contains their contact information. Through the use of such an application, the rider (e.g., rider 200) may request a ride from an autonomous vehicle (e.g., autonomous vehicle 10) at the current time (or by scheduling a ride for some time in the future). At the time that ride is requested, details such as the desired pick-up date and time, the pickup and drop off locations, and the number of seats required may be specified. These ride details may be encoded into a digital ticket (e.g., digital ticket 214) that may be stored in a mobile application (e.g., a smartphone application) for future use. Once generated, the ride request may be sent to a dispatch system (not shown). This dispatch system may select an autonomous vehicle (e.g., autonomous vehicle 10) and (via a telecommunications link) may remotely command an autonomous vehicle (e.g., autonomous vehicle 10) to drive to the appropriate pickup location. A human operator may optionally be involved in the autonomous vehicle's dispatch, either by simply authorizing the pre-selected dispatch or by manually performing other computations/decisions/commands required to dispatch the autonomous vehicle (e.g., autonomous vehicle 10).

Ticket Check

Once the autonomous vehicle (e.g., autonomous vehicle 10) arrives at the requested pickup location, the rider (e.g., rider 200) may be prompted (e.g., via verbal prompting or text-based prompting) to produce their digital ticket (e.g., digital ticket 214) in order to begin their ride. The digital ticket (e.g., digital ticket 214) may be required to enter autonomous vehicle 10, whereby the vehicle doors are unlocked only when a valid digital ticket (e.g., digital ticket 214) is presented. Alternatively, a valid digital ticket (e.g., digital ticket 214) may be required after the rider (e.g., rider 200) has entered the autonomous vehicle (e.g., autonomous vehicle 10) in order to begin the trip. Ride details may be encoded in the digital ticket (e.g., digital ticket 214) and may be sent to the autonomous vehicle (e.g., autonomous vehicle 10) at the time of the ride via a visual code (e.g., QR code or other 1D or 2D barcode) scannable via scanner assembly 210 (e.g., an optical scanner assembly, near-field communication (NFC), radio-frequency identification (RFID), wi-fi, Bluetooth, or other short-range communication technologies). The dispatch system may then utilize the information contained in the digital ticket (e.g., digital ticket 214) in order to fulfill the trip.

Display Screens

One or more display screens (e.g., contextual display assembly 202) may be mounted inside the autonomous vehicle (e.g., autonomous vehicle 10), wherein these display screens (e.g., contextual display assembly 202) may be configured to provide simple, contextually relevant information/prompts to the rider (e.g., rider 200) throughout the course of the trip, wherein such information may include text, graphics, animations and/or sounds.

Message Triggers

Messages shown on the display screens (e.g., contextual display assembly 202) may be triggered by various systems including communication process 250, a remote monitoring system and/or a dispatch system. Additionally, such messages shown on the display screens (e.g., contextual display assembly 202) may be triggered by rider actions, remote monitor actions, trip events, system status and/or other events. For example:

Assume that the autonomous vehicle (e.g., autonomous vehicle 10) has arrived to pick up the rider (e.g., rider 200) and the rider must present a valid digital ticket (e.g., digital ticket 214) in order to begin the trip. Accordingly, the display screen (e.g., contextual display assembly 202) may display a message such as: "Welcome, [Rider Name], please scan your digital ticket to begin." If the rider does not present their digital ticket (e.g., digital ticket 214) after some period of time, a reminder sound may play.

Assume that the autonomous vehicle (e.g., autonomous vehicle 10) is yielding at an intersection for an unusually long amount of time. The display screen (e.g., contextual display assembly 202) may display a message such as "Waiting for path to clear" in order to inform the rider (e.g., rider 200) of the situation and reassure the rider (e.g., rider 200) that nothing is wrong.

Assume that while the autonomous vehicle (e.g., autonomous vehicle 10) is en-route, it is detected that a seatbelt has been unbuckled in an occupied seat. The display screen (e.g., contextual display assembly 202) may display visual and audible warnings to the rider (e.g., rider 200) such as "Please buckle your seatbelt", accompanied by a graphic indicating which seatbelt is unbuckled." If the seatbelt is not re-engaged, the message displayed may escalate to "The vehicle will pull over in [time remaining] seconds" if seat belt is not buckled.

Assume that prior to beginning a trip, if it is detected that a door is open. Accordingly, the display screen (e.g., contextual display assembly 202) may display a message requesting that the rider close the door such as "Please close door to begin your trip." This message may also be accompanied by sounds, graphics, and/or animations.

Message Selection

Communication process 250 may determine which message is appropriate to display at any given time based on a number of factors, including trip status. For example, different messages may be displayed in response to a seatbelt being unbuckled depending on whether the trip has not yet started, is in progress, or has been completed. For example:

During Pickup: If a seatbelt is unbuckled in an occupied seat when the trip status is "Picking-Up," then a message such as "Please buckle your seatbelt so we can start our trip" may be displayed, accompanied by a graphic showing which seatbelt is unbuckled.

While En-Route: If a seatbelt becomes unbuckled in an occupied seat when the trip status is "En-Route," then a more urgent message such as "Please buckle your seatbelt or the vehicle will pull-over" may be displayed, accompanied by a sound to get the attention of the rider (e.g., rider 200).

During Dropoff: If a seatbelt is unbuckled in an occupied seat when the trip status is "Dropping-Off," then this is a desired behavior so there may be no message displayed regarding the seatbelt.

Additionally, messages may be assigned a priority, whereby if multiple messages are triggered, only the highest priority message may be displayed at a given time. Consider the following example in which two messages have been triggered. The vehicle is approaching the drop-off destination, so a first message has been triggered to inform the rider that the trip is nearing completion. Further, a second message has also been triggered because the vehicle is experiencing a fault and is about to pull over. The vehicle fault message may have a higher priority than the approaching destination message, so the display screen (e.g., contextual display assembly 202) may only show the vehicle fault message. The display screen (e.g., contextual display assembly 202) may also include a default (or main) screen (e.g., a map showing the location of autonomous vehicle 10) that is the lowest priority and is only displayed when no other messages have been triggered. Any suppressed messages may either be stored in a queue for later display or not shown at all if they are no longer relevant.

Lighting

Communication process 250 may render unique light codes that vary by intensity, duration, frequency, color, animation pattern, and light display location. These unique light codes may be rendered on light display assembly 204 and may be assigned to each type of message as a secondary method of conveying information to the rider (e.g., rider 200). Messages shown on the display screen (e.g., contextual display assembly 202) may be accompanied by their uniquely assigned light code rendered on light display assembly 204 in order to subtly inform the rider or to generally enhance the vehicle appearance and setting. For example, light display assembly 204 may include animated strip lighting near the top of the windshield that may be used to indicate that autonomous vehicle 10 is turning (much like a turn signal indicator). Light display assembly 204 may also be configured to accompany messages shown on the display screen (e.g., contextual display assembly 202), such as rapidly blinking lights to remind passengers to buckle their seatbelts.

Physical Buttons

Communication process 250 may be configured to interface with one or more physical buttons (e.g., physical button 216) inside autonomous vehicle 10 and may be used by the rider (e.g., rider 200) during the trip to trigger a response from autonomous vehicle 10 (or a remote monitoring system). Further, multiple sets of buttons may be positioned within autonomous vehicle 10 so that passengers throughout autonomous vehicle 10 may have access to a physical button (e.g., physical button 216). For example, if a rider (e.g., rider 200) wishes to stop autonomous vehicle 10 in the middle of a ride, rider 200 may press a physical button (e.g., physical button 216) within autonomous vehicle 10. In response to pressing physical button 216, communication process 250 may send a signal to either autonomous vehicle 10 or to a remote monitoring system (not shown) requesting that autonomous vehicle 10 pull over.

Additionally, physical button 216 located in autonomous vehicle 10 may enable a rider to request support. Accordingly, when a rider (e.g., rider 200) presses physical button 216, communication process 250 may send a signal to the remote monitoring system (not shown) requesting support, wherein the remote monitor responsible for monitoring autonomous vehicle 10 may respond by opening an audio call with rider (e.g., rider 200).

System for Communicating with Remote Support Personnel

Various audio and visual communication equipment may be present in autonomous vehicle 10, examples of which may include cameras, speakers, and microphones. At any time before, during, or after a trip, such audio and visual communication equipment may be used for communication between the rider (e.g., rider 200) and the remote monitor (e.g., in the case of the support request described above).

Mobile Application

Riders (e.g., rider 200) may also use a mobile application (not shown) on their smartphone (not shown) to interact with autonomous vehicle 10 and/or the remote monitor before, during, and after their trip. For example, the current location of autonomous vehicle 10 may be displayed visually on a map within the mobile application (not shown) on their smartphone (not shown). As a further example, a rider (e.g., rider 200) may press a soft button on the mobile application (not shown) on their smartphone (not shown) to request support, pull-over, change destination, or address other vehicle issues.

The Communication System

Accordingly, communication process 250 may monitor 252 the interior of the autonomous vehicle (e.g., autonomous vehicle 10) for information (e.g., information 218) being provided by the rider (e.g., rider 200) of the autonomous vehicle (e.g., autonomous vehicle 10) to the autonomous vehicle (e.g., autonomous vehicle 10).

Specifically and when monitoring 252 the interior of an autonomous vehicle (e.g., autonomous vehicle 10) for information (e.g., information 218) being provided by the rider (e.g., rider 200) of the autonomous vehicle (e.g., autonomous vehicle 10) to the autonomous vehicle (e.g., autonomous vehicle 10), communication process 250 may monitor 254 the interior of the autonomous vehicle (e.g., autonomous vehicle 10) for verbal information (e.g., information 218) being provided by the rider (e.g., rider 200) of the autonomous vehicle (e.g., autonomous vehicle 10) to the autonomous vehicle (e.g., autonomous vehicle 10).

As discussed above, the interior of the autonomous vehicle (e.g., autonomous vehicle 10) may include a microphone assembly (e.g., microphone assembly 208) for obtaining the verbal information (e.g., information 218) provided by the rider (e.g., rider 200) of the autonomous vehicle (e.g., autonomous vehicle 10). For example, if a rider (e.g., rider 200) of autonomous vehicle 10 is displeased with the condition of autonomous vehicle 10, microphone assembly 208 may be configured to enable rider 200 to provide verbal feedback to autonomous vehicle 10 (or to a person remotely-monitoring the operation of autonomous vehicle 10).

Further and when monitoring 252 the interior of an autonomous vehicle (e.g., autonomous vehicle 10) for information (e.g., information 218) being provided by the rider (e.g., rider 200) of the autonomous vehicle (e.g., autonomous vehicle 10) to the autonomous vehicle (e.g., autonomous vehicle 10), communication process 250 may monitor 256 the interior of the autonomous vehicle (e.g., autonomous vehicle 10) for non-verbal information (e.g., information 218) being provided by the rider (e.g., rider 200) of the autonomous vehicle (e.g., autonomous vehicle 10) to the autonomous vehicle (e.g., autonomous vehicle 10).

As discussed above, the interior of the autonomous vehicle (e.g., autonomous vehicle 10) may include an input device for obtaining the non-verbal information (e.g., information 218) provided by the rider (e.g., rider 200) of the autonomous vehicle (e.g., autonomous vehicle 10). Specifically and as discussed above, the interior of autonomous vehicle 10 may include one or more of scanner assembly 210 and keyboard assembly 212. Accordingly, examples of this non-verbal information (e.g., information 218) may include but are not limited to one or more of: text-based information that is provided to keyboard assembly 212 and encoded information (e.g., QR code information, creditcard information, ApplePay™ information, GooglePay™ information or SamsungPay™ information) that is provided to scanner assembly 210.

Once obtained, communication process 250 may process 258 the information (e.g., information 218) provided by the rider (e.g., rider 200) of the autonomous vehicle (e.g., autonomous vehicle 10) to the autonomous vehicle (e.g., autonomous vehicle 10) to generate a response (e.g., response 220) based, at least in part, upon the information (e.g., information 218) provided by the rider (e.g., rider 200) of the autonomous vehicle (e.g., autonomous vehicle 10).

As discussed above, the information provided by the rider (e.g., rider 200) of the autonomous vehicle (e.g., autonomous vehicle 10) may be verbal information (e.g., information 218). Accordingly and when processing 258 the information (e.g., information 218) provided by the rider (e.g., rider 200) of the autonomous vehicle (e.g., autonomous vehicle 10) to the autonomous vehicle (e.g., autonomous vehicle 10) to generate the response (e.g., response 220) based, at least in part, upon the information (e.g., information 218) provided by the rider (e.g., rider 200) of the autonomous vehicle (e.g., autonomous vehicle 10), communication process 250 may process 260 the verbal information (e.g., information 218) provided by the rider (e.g., rider 200) of the autonomous vehicle (e.g., autonomous vehicle 10) to the autonomous vehicle (e.g., autonomous vehicle 10) using Natural Language Understanding (NLU) to generate the response (e.g., response 220) based, at least in part, upon the verbal information (e.g., information 218) provided by the rider (e.g., rider 200) of the autonomous vehicle (e.g., autonomous vehicle 10).

As is known in the art, Natural language Understanding (NLU) is a branch of artificial intelligence (AI) that uses computer software to understand verbal inputs provided by a user (e.g., rider 200). NLU may directly enable human-computer interaction (HCI), wherein the understanding of natural human language enables computers to understand human-provided commands (without the formalized syntax of computer languages) while enabling these computers to respond to the human in their own language. The field of NLU is an important and challenging subset of natural language processing (NLP). While both understand human language, NLU is tasked with communicating with untrained individuals and understanding their intent, meaning that NLU goes beyond understanding words and actually interprets the meaning of such words. NLU may use algorithms to reduce human speech into a structured ontology, fleshing out such things as intent, timing, locations and sentiments.

Once generated, communication process 250 may provide 262 the response (e.g., response 220) to the rider (e.g., rider 200) of the autonomous vehicle (e.g., autonomous vehicle 10).

When providing 262 the response (e.g., response 220) to the rider (e.g., rider 200) of the autonomous vehicle (e.g., autonomous vehicle 10), communication process 250 may provide 264 a verbal response (e.g., response 220) to the rider (e.g., rider 200) of the autonomous vehicle (e.g., autonomous vehicle 10).

As discussed above, the interior of the autonomous vehicle (e.g., autonomous vehicle 10) may include a speaker assembly (e.g., speaker assembly 206) for providing the verbal response to the rider (e.g., rider 200) of the autonomous vehicle (e.g., autonomous vehicle 10). For example, if autonomous vehicle 10 just picked up a rider and is getting ready to depart, speaker assembly 206 may be configured to render an audio-based message that says "Welcome aboard. Please buckle your seatbelt so we can depart."

Further and when providing 262 the response (e.g., response 220) to the rider (e.g., rider 200) of the autonomous vehicle, communication process 250 may provide 266 a non-verbal response (e.g., response 220) to the rider (e.g., rider 200) of the autonomous vehicle (e.g., autonomous vehicle 10).

Accordingly, the interior of the autonomous vehicle (e.g., autonomous vehicle 10) includes an output assembly (e.g., contextual display assembly 202 and/or light display assembly 204) for providing the non-verbal response to the rider (e.g., rider 200) of the autonomous vehicle (e.g., autonomous vehicle 10). For example, if autonomous vehicle 10 is approaching its intended destination, contextual display assembly 202 may be configured to render a text-based message for rider 200 that says "Arriving at your destination. Please exit from the right-side of the vehicle." Additionally, if autonomous vehicle 10 is going to be turning right at an intersection, light display assembly 204 may be configured to render a right-sweeping image to indicate that the autonomous vehicle (e.g., autonomous vehicle 10) will be turning right.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    monitoring, using at least one sensor, the interior of an autonomous vehicle for information being provided by a rider of the autonomous vehicle to the autonomous vehicle;
    processing, at an electronic control unit (ECU), the information provided by the rider of the autonomous vehicle to the autonomous vehicle;
    generating a response based, at least in part, upon the information provided by the rider of the autonomous vehicle, wherein the response comprises a unique light code; and
    emitting light from a light source disposed at the top of the windshield of the autonomous vehicle based on the generated unique light code, wherein the light source comprises animated strip lighting.

2. The computer-implemented method of claim 1 wherein monitoring the interior of the autonomous vehicle for information being provided by the rider of the autonomous vehicle to the autonomous vehicle comprises:
    monitoring the interior of the autonomous vehicle for verbal information being provided by the rider of the autonomous vehicle to the autonomous vehicle; and
    wherein the at least one sensor comprises a microphone assembly for obtaining the verbal information provided by the rider of the autonomous vehicle.

3. The computer-implemented method of claim 1 wherein monitoring the interior of the autonomous vehicle for information being provided by the rider of the autonomous vehicle to the autonomous vehicle comprises:
    monitoring the interior of the autonomous vehicle for non-verbal information being provided by the rider of the autonomous vehicle to the autonomous vehicle; and
    wherein the at least one sensor comprises an input device for obtaining the non-verbal information provided by the rider of the autonomous vehicle.

4. The computer-implemented method of claim 3 wherein the non-verbal information comprises one or more of:
   text-based information; and
   encoded information.

5. The computer-implemented method of claim 1 further comprising:
   displaying, on a display disposed within the autonomous vehicle, a message associated with the unique light code to the rider of the autonomous vehicle.

6. The computer-implemented method of claim 1, further comprising:
   providing a verbal response associated with the unique light code to the rider of the autonomous vehicle; and
   wherein the interior of the autonomous vehicle comprises a speaker assembly for providing the verbal response to the rider of the autonomous vehicle.

7. The computer-implemented method of claim 1, further comprising:
   providing a non-verbal response to the rider of the autonomous vehicle; and
   wherein the interior of the autonomous vehicle comprises an output assembly for providing the non-verbal response to the rider of the autonomous vehicle.

8. The computer-implemented method of claim 7 wherein the non-verbal response comprises a text-based response.

9. The computer-implemented method of claim 1 wherein the information provided by the rider of the autonomous vehicle is verbal information.

10. The computer-implemented method of claim 9 wherein processing the information provided by the rider of the autonomous vehicle to the autonomous vehicle comprises:
    processing the verbal information provided by the rider of the autonomous vehicle to the autonomous vehicle using Natural Language Understanding (NLU).

11. A computer program product residing on a computer readable medium having a plurality of instructions stored thereon which, when executed by a processor, cause the processor to perform operations comprising:
    monitoring, using at least one sensor, the interior of an autonomous vehicle for information being provided by a rider of the autonomous vehicle to the autonomous vehicle; and
    processing, at an electronic control unit (ECU), the information provided by the rider of the autonomous vehicle to the autonomous vehicle,
    generating a response based, at least in part, upon the information provided by the rider of the autonomous vehicle, wherein the response comprises a unique light code; and
    emitting light from a light source disposed at the top of the windshield of the autonomous vehicle based on the generated unique light code, wherein the light source comprises animated strip lighting.

12. The computer program product of claim 11 wherein monitoring the interior of the autonomous vehicle for information being provided by the rider of the autonomous vehicle to the autonomous vehicle comprises:
    monitoring the interior of the autonomous vehicle for verbal information being provided by the rider of the autonomous vehicle to the autonomous vehicle; and
    wherein the at least one sensor comprises a microphone assembly for obtaining the verbal information provided by the rider of the autonomous vehicle.

13. The computer program product of claim 11 wherein monitoring the interior of the autonomous vehicle for information being provided by the rider of the autonomous vehicle to the autonomous vehicle comprises:
    monitoring the interior of the autonomous vehicle for non-verbal information being provided by the rider of the autonomous vehicle to the autonomous vehicle; and
    wherein the at least one sensor comprises an input device for obtaining the non-verbal information provided by the rider of the autonomous vehicle.

14. The computer program product of claim 13 wherein the non-verbal information comprises one or more of:
    text-based information; and
    encoded information.

15. The computer program product of claim 11 further comprising:
    displaying, on a display disposed within the autonomous vehicle, a message associated with the unique light code to the rider of the autonomous vehicle.

16. The computer program product of claim 11, further comprising:
    providing a verbal response associated with the unique light code to the rider of the autonomous vehicle; and
    wherein the interior of the autonomous vehicle comprises a speaker assembly for providing the verbal response to the rider of the autonomous vehicle.

17. The computer program product of claim 11, further comprising:
    providing a non-verbal response to the rider of the autonomous vehicle; and
    wherein the interior of the autonomous vehicle comprises an output assembly for providing the non-verbal response to the rider of the autonomous vehicle.

18. The computer program product of claim 17 wherein the non-verbal response comprises a text-based response.

19. The computer program product of claim 11 wherein the information provided by the rider of the autonomous vehicle is verbal information.

20. The computer program product of claim 19 wherein processing the information provided by the rider of the autonomous vehicle to the autonomous vehicle comprises:
    processing the verbal information provided by the rider of the autonomous vehicle to the autonomous vehicle using Natural Language Understanding (NLU).

21. A computing system comprising a processor and memory configured to perform operations comprising:
    monitoring, using at least one sensor, the interior of an autonomous vehicle for information being provided by a rider of the autonomous vehicle to the autonomous vehicle;
    processing, at an electronic control unit (ECU), the information provided by the rider of the autonomous vehicle to the autonomous vehicle;
    generating a response based, at least in part, upon the information provided by the rider of the autonomous vehicle, wherein the response comprises a unique light code; and
    emitting light from a light source disposed at the top of the windshield of the autonomous vehicle based on the generated unique light code, wherein the light source comprises animated strip lighting.

22. The computing system of claim 21 wherein monitoring the interior of the autonomous vehicle for information being provided by the rider of the autonomous vehicle to the autonomous vehicle comprises:
- monitoring the interior of the autonomous vehicle for verbal information being provided by the rider of the autonomous vehicle to the autonomous vehicle; and
- wherein the at least one sensor comprises a microphone assembly for obtaining the verbal information provided by the rider of the autonomous vehicle.

23. The computing system of claim 21 wherein monitoring the interior of the autonomous vehicle for information being provided by the rider of the autonomous vehicle to the autonomous vehicle comprises:
- monitoring the interior of the autonomous vehicle for non-verbal information being provided by the rider of the autonomous vehicle to the autonomous vehicle; and
- wherein the at least one sensor comprises an input device for obtaining the non-verbal information provided by the rider of the autonomous vehicle.

24. The computing system of claim 23 wherein the non-verbal information comprises one or more of:
- text-based information; and
- encoded information.

25. The computing system of claim 21 further comprising:
- displaying, on a display disposed within the autonomous vehicle, a message associated with the unique light code to the rider of the autonomous vehicle.

26. The computing system of claim 21, further comprising:
- providing a verbal response associated with the unique light code to the rider of the autonomous vehicle; and
- wherein the interior of the autonomous vehicle comprises a speaker assembly for providing the verbal response to the rider of the autonomous vehicle.

27. The computing system of claim 21, further comprising:
- providing a non-verbal response to the rider of the autonomous vehicle; and
- wherein the interior of the autonomous vehicle comprises an output assembly for providing the non-verbal response to the rider of the autonomous vehicle.

28. The computing system of claim 27 wherein the non-verbal response comprises a text-based response.

29. The computing system of claim 21 wherein the information provided by the rider of the autonomous vehicle is verbal information.

30. The computing system of claim 29 wherein processing the information provided by the rider of the autonomous vehicle to the autonomous vehicle comprises:
- processing the verbal information provided by the rider of the autonomous vehicle to the autonomous vehicle using Natural Language Understanding (NLU).

* * * * *